United States Patent [19]

Ismer

[11] 4,043,544
[45] Aug. 23, 1977

[54] REINFORCED AND VENTILATED SEATS

[76] Inventor: Walter Ismer, Feldhausen 9, 4018 Langenfeld, Germany

[21] Appl. No.: 665,111

[22] Filed: Mar. 8, 1976

[30] Foreign Application Priority Data

Mar. 8, 1975 Germany ............................. 2510182

[51] Int. Cl.² ............................................. A47C 27/12
[52] U.S. Cl. .................................... 267/83; 267/145; 5/347; 297/453
[58] Field of Search ............... 267/133, 131, 142, 143, 267/144, 145, 81, 82, 117; 297/453, 180, DIG. 1; 5/347

[56] References Cited

U.S. PATENT DOCUMENTS

| 2,012,042 | 8/1935 | Gerlozson et al. | 267/145 |
| 2,025,712 | 12/1935 | Bickett | 267/145 |
| 3,058,125 | 10/1962 | Zerbee | 5/347 |
| 3,087,756 | 4/1963 | Flint | 267/83 |
| 3,506,308 | 4/1970 | Fenton | 297/453 |
| 3,770,318 | 11/1973 | Fenton | 297/453 |
| 3,818,522 | 6/1974 | Schuster | 297/453 |

Primary Examiner—James B. Marbert
Attorney, Agent, or Firm—Diller, Brown, Ramik & Wight

[57] ABSTRACT

This disclosure relates to a pad for seats, back rests, mattresses and the like comprising a pad body of plastic material with recess means therein and a covering layer overlying the pad body, strips of reinforcing material sandwiched between the pad body and the covering layer, and at least selected ones of the strips being in alignment with the recess means whereby heat is dissipated from the covering layer through the recess means and the pad is reinforced by said strips.

9 Claims, 6 Drawing Figures

REINFORCED AND VENTILATED SEATS

This invention relates to pads for seats, back rests, mattresses and the like, particularly seats for motor vehicles, which includes a pad body formed of plastic foam material provided with recesses or channels therein and being reinforced by strips of steel or like material.

It is conventional to provide pads or cushions for seats and back rests of motor vehicles with plastic foam bodies having a number of ventilation channels arranged perpendicularly to the seat and rest surfaces in order to make possible ventilation of and dissipation of heat from the pad. The ventilation channels pass completely through the pad body and the covering material. In the case of such pads being composed only of expanded rubber or plastic foam material, the ventilation recesses and/or channels are generally compressed and/or constricted when a person sits thereupon. The latter defeats the purpose of the channels and/or recesses because ventilation is precluded and heat is not dissipated in the required manner.

The latter disadvantages of conventional constructions are obviated by the present invention in which a pad of plastic foam material or the like is provided with a steel inlay in a manner in which ventilation is not disrupted and heat is dissipated through the pad. Preferably the strips of spring steel material align a plane normal to openings of the pad and/or within ventilation channels of the pad which increases rigidity yet permits thorough ventilation. The spring steel strips thus increase the rigidity of the pad under load, while at the same time provide a restoring force due to the inherent resilience thereof which as a consequence assures firm support and adequate ventilation. Due to the location of the strips in the area of the channels or apertures, the latter cannot be compressed together (closed) so that compression of the overall pad body is substantially attenuated.

In further accordance with this invention, the pad body includes a plurality of intersecting channels or aligned apertures with the strips lying thereover which provides a pumping effect during the application of positive (seating) and negative (raising) pressure. The strips preferably cover the channels or apertures substantially in their entirety, but not totally and thus upon an unweighting or upward movement of a person seated thereupon, a suction action is induced which leads to an increased ventilation of the overall pad, thereby dissipating heat.

In further accordance with this invention, the strips intersect each other and at the point of intersection there are arranged discs or plates which have a smaller area cross-sectionalwise than that of the ventilation channels and/or apertures. Due to this construction, the pumping action or breathing action of the pad is considerably increased. Essentially the discs provide a piston action relative to the channels and/or apertures while at the same time serving to connect the strips to each other to prevent relative movement between the strips and associated noise which might otherwise occur. Preferably the discs include projections which are disposed in the apertures which make certain that the strips are maintained in desired alignment and also assist in the pumping action or breathing action of the pad.

The reinforcing strips may be disposed in side-by-side relationship or in cross relationship to each other. Advantageously, the strips can also be formed as loops with the ends abutting one another. The mutually-abutting ends of the strips are preferably surrounded by a sleeve to which the strips may be connected.

In further accordance with this invention, the strips are provided with terminal ends which are angulated to grippingly engage the plastic material of the pad body. The pad body may be provided with slits or apertures for the receipt of such angled ends of the strips.

In further accordance with this invention, the pad body is provided with a supporting shell having apertures or perforations so that any load placed upon the pad causing the compression of air will result in ventilation of such air through the apertures of the supporting shell.

In further accordance with this invention the pad body may consist of several layers with the channels and/or apertures of one layer being of a configuration other than those of the other layer. Due to the latter construction, it is assured that adequate ventilation is achieved by a pumping action with air flowing through the channels and/or apertures upon the weighting (sitting down) or unweighting (rising) of a person sitting upon or rising relative to the pad body.

In further accordance with this invention, the pad body is covered by a layer or covering of relatively thin material consisting of spun fibers, capok, or the like. Preferably the covering layer is formed of imperforate material and may also be shaped as a shell of foam plastic material.

With the above and other objects in view that will hereinafter appear, the nature of the invention will be more clearly understood by reference to the following detailed description, the appended claimed subject matter, and the several views illustrated in the accompanying drawings.

Figure 1:
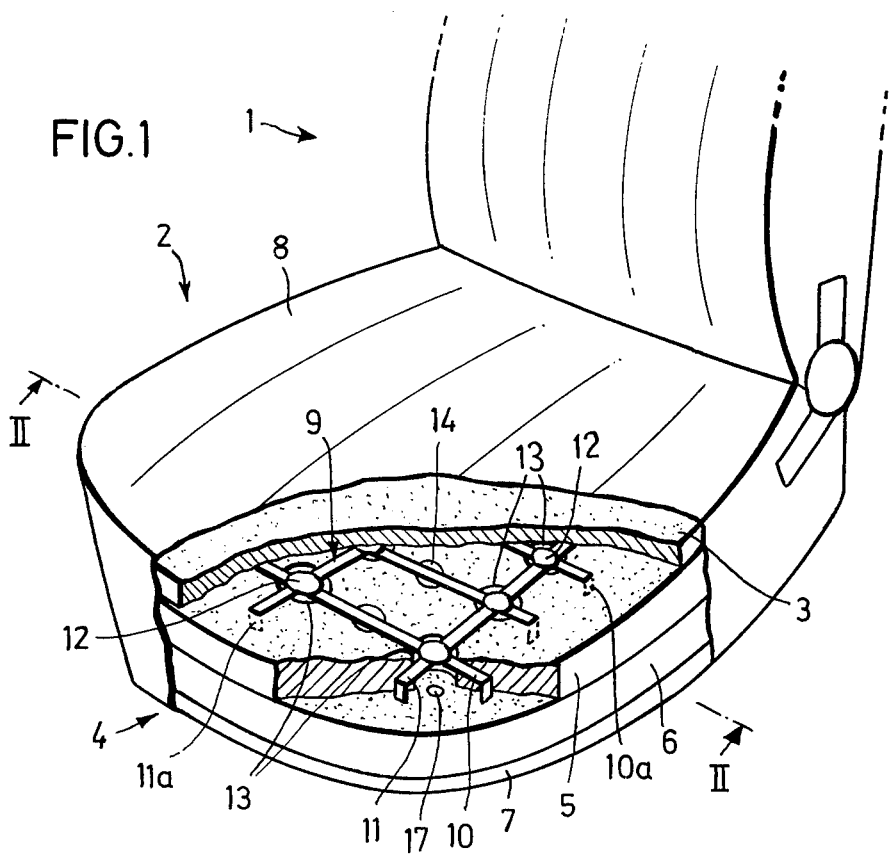
FIG. 1 is a perspective view with a portion thereof broken away for clarity, and illustrates a seat and back and the seat including channel means and/or apertures across which are disposed strips of steel.

Reference is first made to FIG. 1 of the drawings which illustrates a vehicle seat 1 which includes a pad 2 having a cover 3 enclosing a pad body 4 of polymeric or copolymeric plastic material, such as polyuretheyene. The pad body 4 may include a plurality of layers 5, 6, etc. The latter layers 5, 6, etc. rest upon a support or frame 7 and the overall assembly is covered by a cover, generally designated by the reference numeral 8.

Disposed beneath the layer 3 is means, generally designated by the reference numeral 9 which is a plurality of spring steel strips 10, 11 disposed in intersecting relationship to each other and seated upon the layer 5. The strips 10, 11 are preferably connected to each other at the points (unnumbered) of intersection therebetween by means of plates 12 in the form of relatively small discs formed of rubber, plastic or like material. The discs 12 include a head (unnumbered) and a projection (unnumbered). Each projection passes through aligned apertures (unnumbered) at the intersection of the strips 10, 11 and project into aperture means 13 of the layer 5. The aperture means 13 are illustrated as cylindrical openings which are in communication with each other by upwardly opening channels (unnumbered).

The strips 10, 11 are preferably formed from known mattress-framework strip steel which has a high bending capacity. A carbon steel with a C-content of between 0.35 and 0.65 is preferable. The steel strips 10, 11 are cold-rolled and tempered to a tensilestrength of between 100 and 170 KP/mm$^2$.

The pad body 4 which is composed of one or more layers is provided with the aperture means or channels 13 which open upwardly through the layer 5. The aperture means or channels 13 are, as heretofore noted, arranged at intersections of the strips 10, 11 and additional aperture means 14 may be provided in registry with the strips 10, 11. The latter apertures 14 provide additional venting means for the overall pad body 4.

The discs 12 at the intersection of each of the strips 10, 11 have an area which is slightly smaller than the crosssection of the apertures 13. Thus, each disc 12 associated with the aperture 13 provides a pumping-like action as one sits upon or raises from the seat 2. The latter action provides total ventilation of the overall seat pad 2.

The strips 10, 11 are preferably provided with angled ends 10a, 11a which engage in corresponding recesses or slots 15 of the pad body 4 or the layer 5 located therebelow. The angled portions 10a, 11a need not particularly be located in the recesses or slots 15, but may embrace the periphery (unnumbered) of the body 5.

Figure 3:
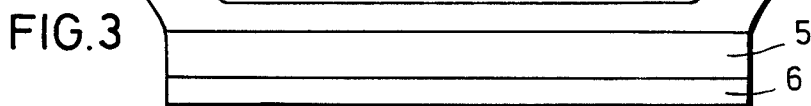
FIG. 3 is a front elevational view of the seat of FIG. 1, and illustrates a pair of pads thereof.
Figure 4:
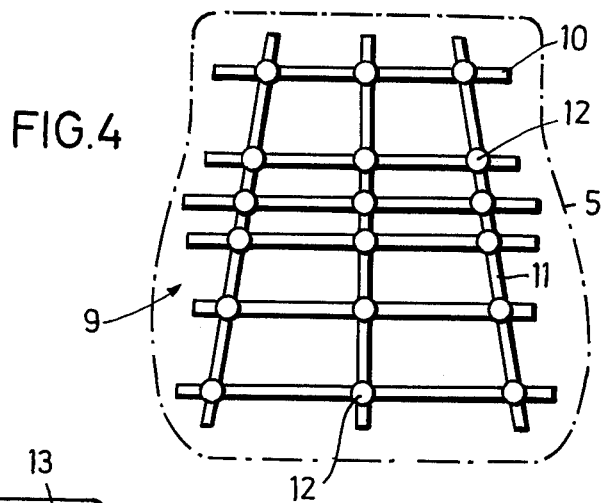
FIG. 4 is a top plan view of a pad body, and illustrates the manner in which discs unite reinforcing strips to one another.
Figure 5:
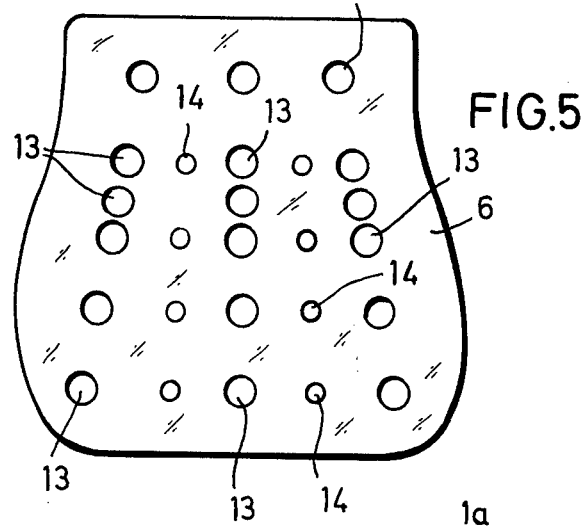
FIG. 5 is a top plan view of another pad body, and illustrates the manner in which a plurality of apertures are aligned with each other in lieu of the channels of FIG. 1.

The layer 3 is preferably impermeable and may consist of spun fibers, capok, or the like. Though generally uncontoured, the covering layer 3 might be formed as a shaped seat 16 (FIG. 3) composed of suitable aerated plastic material. The seat 16, just as the non-apertured cover 3, is preferably designed to be readily exchangeable.

The apertures and/or channels and/or vent holes 13, 14 preferably extend through the entirety of the pad body 4 and/or the layers 5 and 6 thereof. Vent holes 17 are also provided in the support member 6 and the cross-sectional area thereof is less than that of the aperture means 13, 14 in order to obtain a pumping action due to one seating upon and rising from the seat 2. However, the relationship of the cross-sectional areas of the apertures 13, 17 can be reversed to achieve the same pumping action. Furthermore, instead of the two layers or pads 5, 6 below the strips 10, 11, there may also be arranged more than two layers of aerated plastic material or the like which consists of materials of different elasticity and rigidity.

The intersecting steel strips 10, 11 may also be secured to one another by welding, spot welding, or the like. The strips 10, 11 may be secured in place by disposing the downwardly directed projections 10a, 11a, into the vent holes 14 and/or 13. In this manner the overall spring steel inlay 9 can be centered relative to the aperture means, channel means or vent openings 13, 14.

Figure 2:
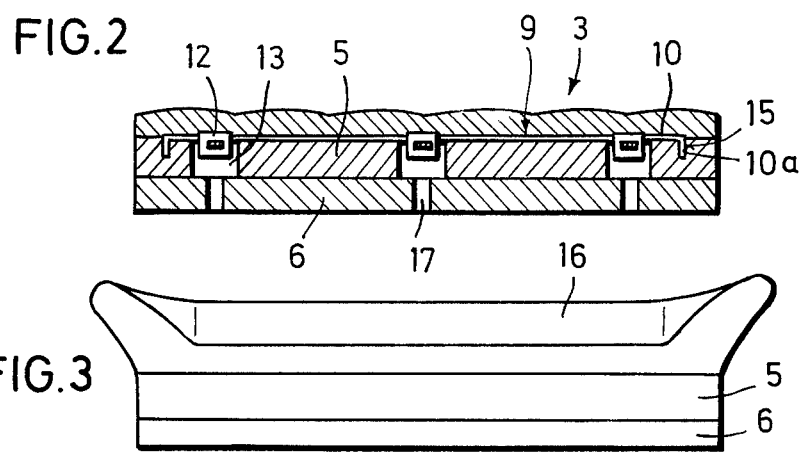
FIG. 2 is a cross-sectional view taken generally along line II—II of FIG. 1, and illustrates projections of discs which unite the strips to each other projecting into apertures of the pad body.
Figure 6:
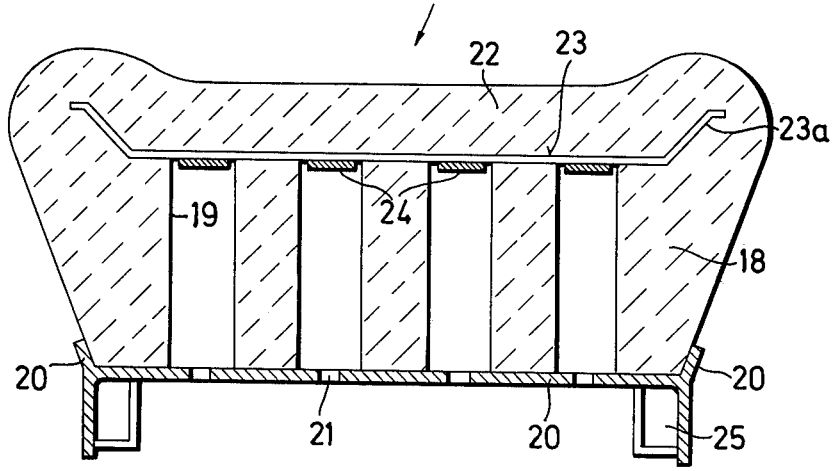
FIG. 6 is a cross-sectional view taken through another seat of this invention, and illustrates the manner in which reinforcing strips are associated with apertures therein.

Referring to the specific embodiment of the invention illustrated in FIG. 6, a pad body 18 includes a plurality of vent holes 19 of a uniform diameter with the pad body 18 being supported at its underside by a supporting shell 20 having perforations 21 therein which are of a smaller cross-sectional area than the aperture means or vent holes 19. A covering layer 22 is a part of a homogenous integral mass of material in which is inlaid the spring steel strips 23, 24 intersecting at the apertures 19. As in the case of the spring steel strips 10, 11 of FIGS. 1 and 2, the strips 23, 24 may be provided with angled ends 23a which are embedded in the pad body 18. The supporting shell 20 may be reinforced by channel supports 25.

While preferred forms and arrangment of parts have been shown in illustrating the invention, it is to be clearly understood that various changes in details and arrangement of parts may be made without departing from the scope and spirit of this disclosure.

What is claimed is:

1. A pad for seats, back rests, mattresses and the like comprising a pad body of plastic material, recess means in said pad body, a covering layer overlying said pad body and the recess means therein, strips of reinforcing material sandwiched between said pad body and said covering layer, at least selected ones of said strips being in alignment with said recess means whereby heat is dissipated from the covering layer through said recess means and the pad is reinforced by said strips, said recess means being a plurality of aligned apertures passing through said pad body, said selected ones of said strips overlie said apertures, disc means at the intersection of said strips, and the area of each said disc means being less than the cross-sectional area of an aperture.

2. The pad as defined in claim 1 wherein each disc means projects into an associated aperture.

3. A pad for seats, back rests, mattresses and the like comprising a pad body of plastic material, recess means in said pad body, a covering layer overlying said pad body and the recess means therein, strips of reinforcing material sandwiched between said pad body and said covering layer, at least selected ones of said strips being in alignment with said recess means whereby heat is dissipated from the covering layer through said recess means and the pad is reinforced by said strips, said recess means are a plurality of apertures passing through said pad body, said selected ones of said strips overlie said apertures, disc means at the intersection of said strips, and said disc means including projections which project into said apertures.

4. A pad for seats, back rests, mattresses and the like comprising a pad body of plastic material, recesss means in said pad body, a covering layer overlying said pad body and the recess means therein, strips of reinforcing material sandwiched between said pad body and said covering layer, at least selected ones of said strips being in alignment with said recess means whereby heat is dissipated from the covering layer through said recess means and the pad is reinforced by said strips, said selected strips intersect each other, means connecting said strips to each other at the intersections thereof, and said connecting means being constructed and arranged to permit relative movement between said strips and said connecting means.

5. A pad for seats, back rests, mattresses and the like comprising a pad body of plastic material, recess means in said pad body, a covering layer overlying said pad body and the recess means therein, strips of reinforcing material sandwiched between said pad body and said covering layer, at least selected ones of said strips being in alignment with said recess means whereby heat is dissipated from the covering layer through said recess means and the pad is reinforced by said strips, said recess means being defined by a plurality of intersecting channels opening upwardly through said pad body, an aperture passing through said pad body at least at selected points of intersection of said channels, and said selected ones of said strips intersecting each other at said points of intersection.

6. A pad for seats, back rests, mattresses and the like comprising a pad body of plastic material, recess means in said pad body, a covering layer overlying said pad body and the recess means therein, strips of reinforcing material sandwiched between said pad body and said covering layer, at least selected ones of said strips being in alignment with said recess means whereby heat is dissipated from the covering layer through said recess means and the pad is reinforced by said strips, said recess means are defined by a plurality of apertures passing through said pad body, said apertures being overlaid by said strips, and said selected ones of said strips intersecting each other at said apertures.

7. A pad for seats, back rests, mattresses and the like comprising a pad body of plastic material, recess means in said pad body, a covering layer overlying said pad body and the recess means therein, strips of reinforcing material sandwiched between said pad body and said covering layer, at least selected ones of said strips being in overlying alignment with said recess means whereby heat is dissipated from the covering layer to said recess means and the pad is reinforced by said strips, said recess means are defined by a plurality of apertures passing through said pad body, and said selected ones of said strips being of a width to substantially though not entirely cover said apertures whereby a pumping action is effected during repetitious compression and expansion of said pad body.

8. The pad as defined in claim 7 wherein said recess means additionally include elongated grooves opening in a direction toward said covering layer, and said selected ones of said strips are in alignment with selected ones of said grooves.

9. The pad as defined in claim 7 wherein said selected strips intersect each other at at least selected ones of said apertures.

* * * * *